United States Patent
Burton

[11] Patent Number: 6,113,301
[45] Date of Patent: Sep. 5, 2000

[54] DISENGAGEABLE PIVOT JOINT

[76] Inventor: John E. Burton, 707 W. Court St., Ludington, Mich. 49431

[21] Appl. No.: 09/023,276

[22] Filed: Feb. 13, 1998

[51] Int. Cl.[7] .................................................... F16C 11/06
[52] U.S. Cl. .......................... 403/122; 403/348; 403/115; 403/76; 403/132; 362/515
[58] Field of Search ................................ 403/122, 132, 403/135, 128, 142, 348, 114, 115, 76; 362/515, 528

[56] References Cited

U.S. PATENT DOCUMENTS

| | | |
|---|---|---|
| 3,396,554 | 8/1968 | Westercamp ...................... 403/348 X |
| 3,564,984 | 2/1971 | Alexander ........................ 403/348 X |
| 4,084,913 | 4/1978 | Schenk . |
| 4,111,570 | 9/1978 | Morel . |
| 4,200,405 | 4/1980 | Bauer . |
| 4,465,393 | 8/1984 | Dieckmann . |
| 4,574,334 | 3/1986 | Igura . |
| 4,607,976 | 8/1986 | Peek et al. . |
| 4,689,725 | 8/1987 | Saijo et al. . |
| 4,703,399 | 10/1987 | Van Duyn et al. . |
| 4,707,769 | 11/1987 | Van Duyn . |
| 4,707,770 | 11/1987 | Van Duyn . |
| 4,707,771 | 11/1987 | Van Duyn et al. . |
| 4,709,306 | 11/1987 | Harris et al. . |
| 4,839,785 | 6/1989 | Ohishi . |
| 4,849,860 | 7/1989 | Schauwecker . |
| 4,882,658 | 11/1989 | Allen . |
| 4,974,123 | 11/1990 | Luallin et al. . |
| 5,011,322 | 4/1991 | Schauwecker . |
| 5,034,870 | 7/1991 | Weber . |
| 5,045,987 | 9/1991 | Herbert . |
| 5,047,904 | 9/1991 | Vraux . |
| 5,063,481 | 11/1991 | Martin . |
| 5,095,411 | 3/1992 | Peck et al. . |
| 5,153,976 | 10/1992 | Benchaar et al. . |
| 5,161,877 | 11/1992 | Wright et al. . |
| 5,186,531 | 2/1993 | Ryder et al. . |
| 5,186,532 | 2/1993 | Ryder et al. . |
| 5,258,894 | 11/1993 | Bivens . |
| 5,270,907 | 12/1993 | Lisak . |
| 5,360,282 | 11/1994 | Nagengast et al. . |
| 5,365,415 | 11/1994 | Schmitt et al. . |
| 5,381,317 | 1/1995 | Schmitt et al. . |
| 5,428,511 | 6/1995 | Luallin et al. . |
| 5,483,425 | 1/1996 | Laullin et al. . |
| 5,577,836 | 11/1996 | Vent et al. . |
| 5,642,935 | 7/1997 | Schmitt . |
| 5,653,548 | 8/1997 | Amdahl ............................... 403/122 X |
| 5,673,992 | 10/1997 | Schmitt . |
| 5,707,133 | 1/1998 | Burton . |
| 5,915,831 | 6/1999 | Bonin et al. ......................... 362/515 X |

Primary Examiner—Terry Lee Melius
Assistant Examiner—John R. Cottingham
Attorney, Agent, or Firm—Brian G. Gilpin; Godfrey & Kahn, S.C.

[57] ABSTRACT

A disengageable pivot connection includes a ball stud that is capable of being selectively removed from the corresponding socket. The ball stud includes an engagement head that has substantially flat faces or grooves that correspond to tabs extending from the rim of the socket into which the ball stud is engaged. To install, the ball stud is inserted into the socket such that the substantially flat faces or grooves on the head pass by the tabs extending from the rim of the socket. Then, the ball stud is rotated such that the head engages the tabs extending from the rim of the socket. Alternatively, the head of the ball stud is snap-fitted into the socket as is conventional in the art. As such, the head cannot be removed from the socket without additional rotation. The head remains free to pivot within the socket as required for the particular application. One particularly desirable application of the present invention is in automotive lamp assemblies.

46 Claims, 7 Drawing Sheets

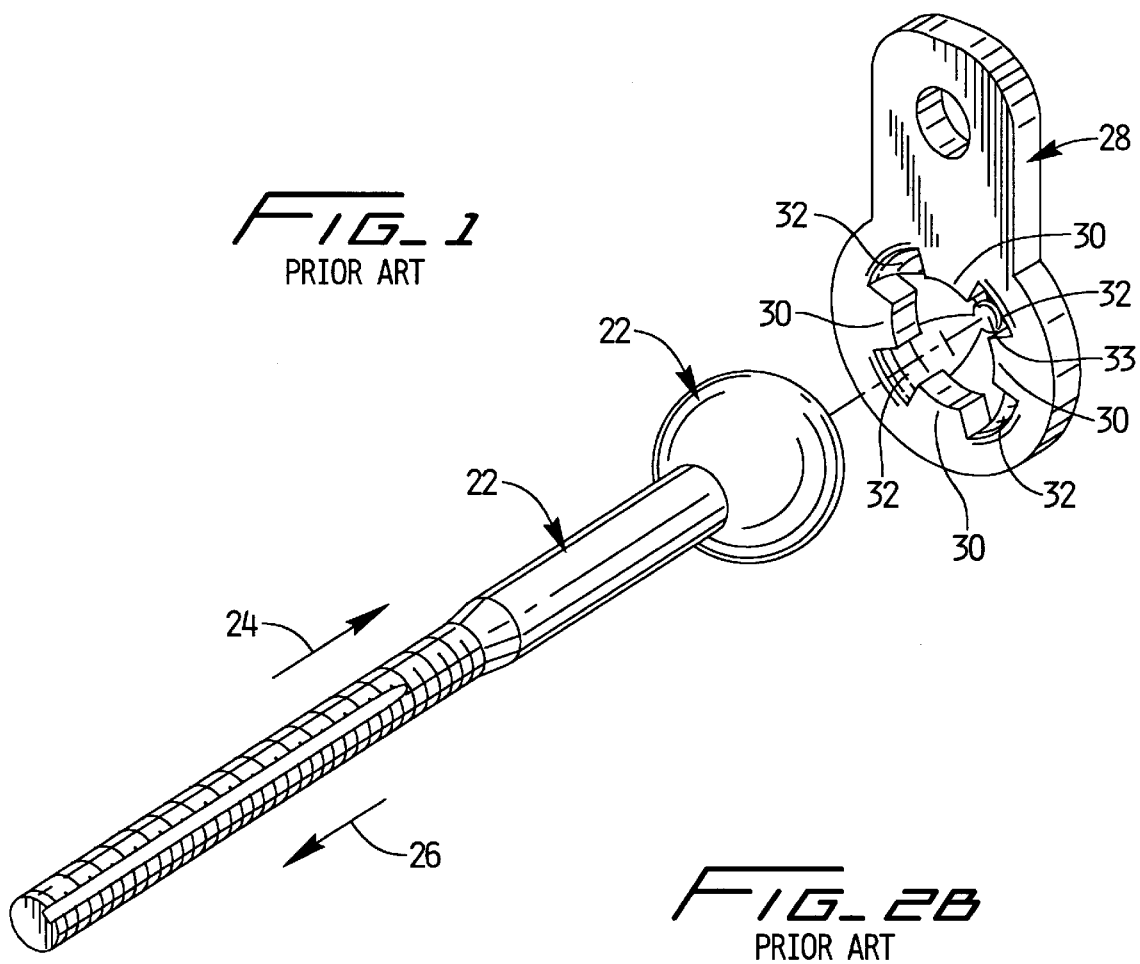
FIG_1
PRIOR ART
FIG_2B
PRIOR ART
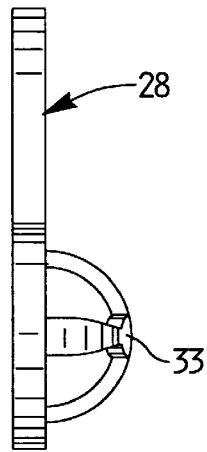
FIG_2A
PRIOR ART
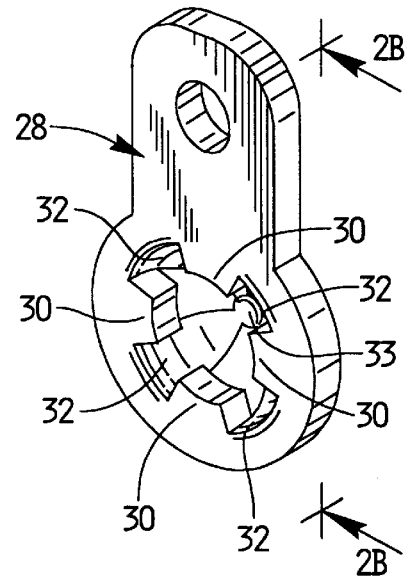

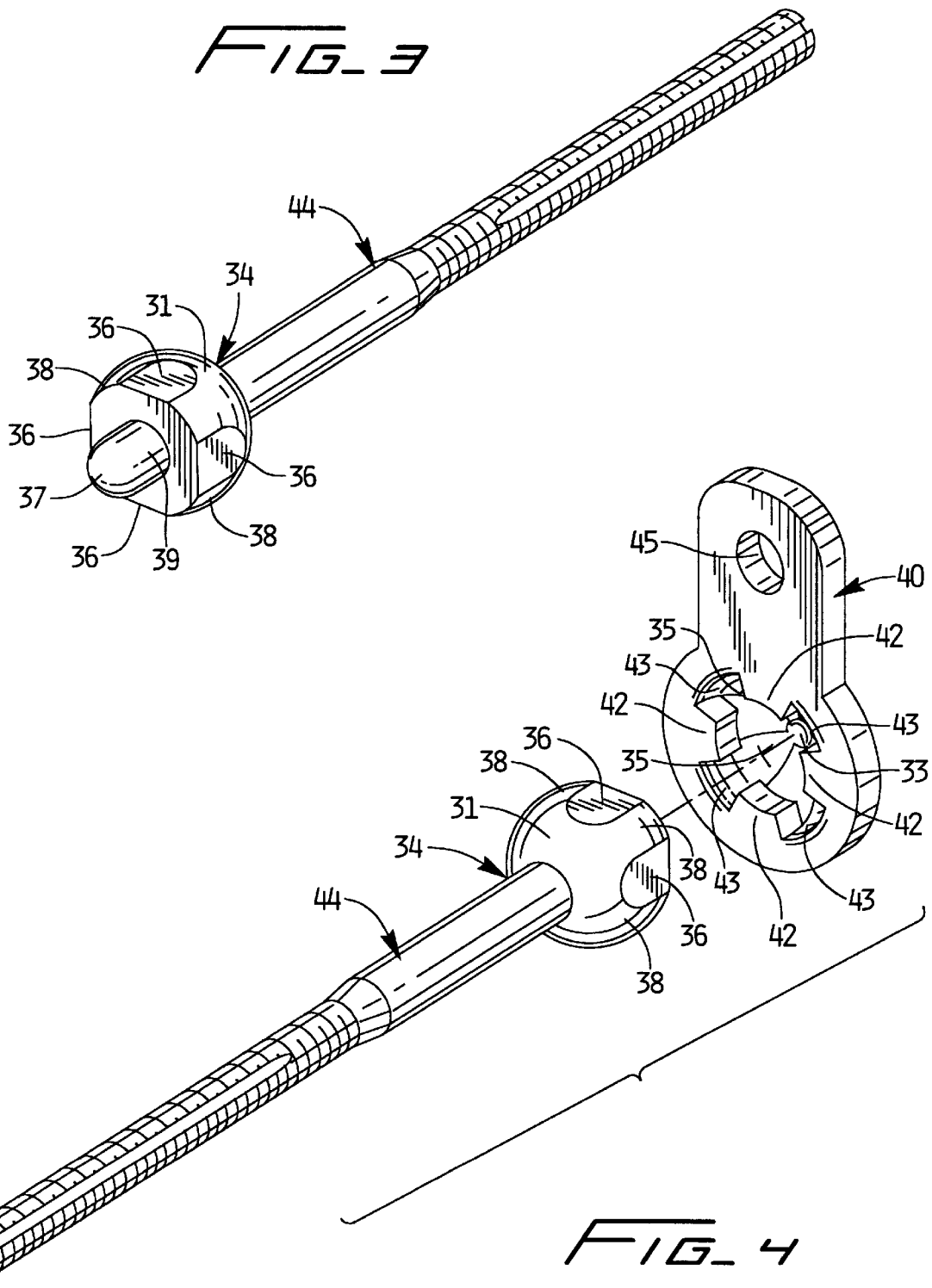

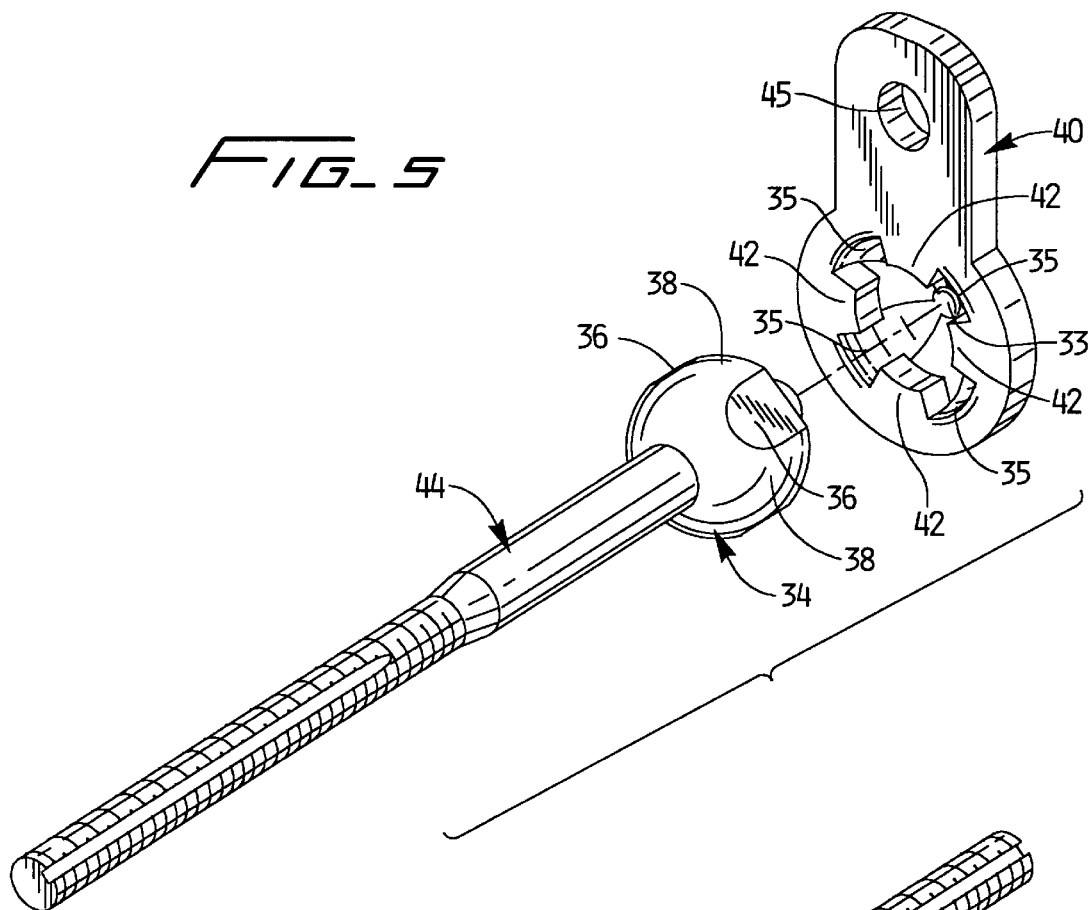
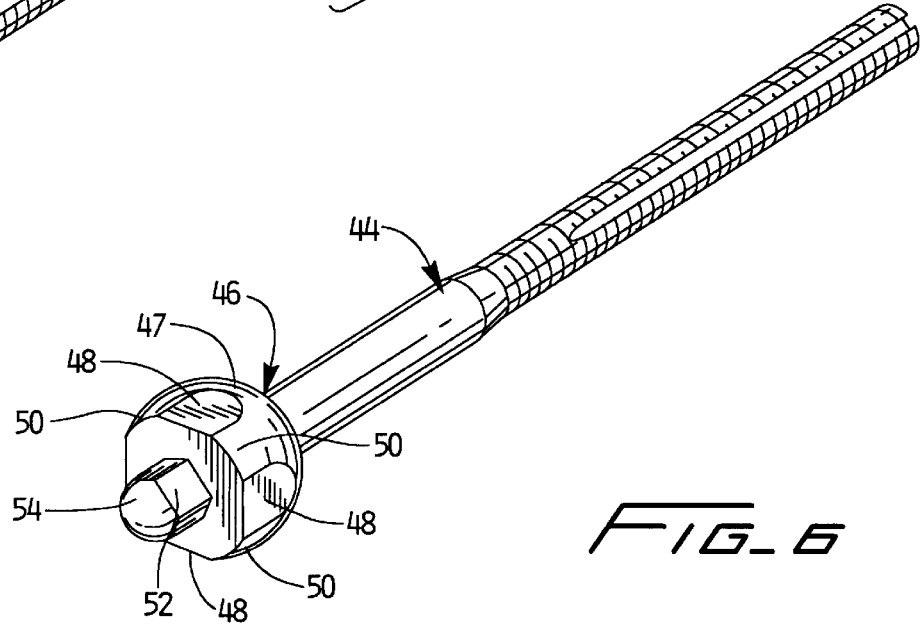

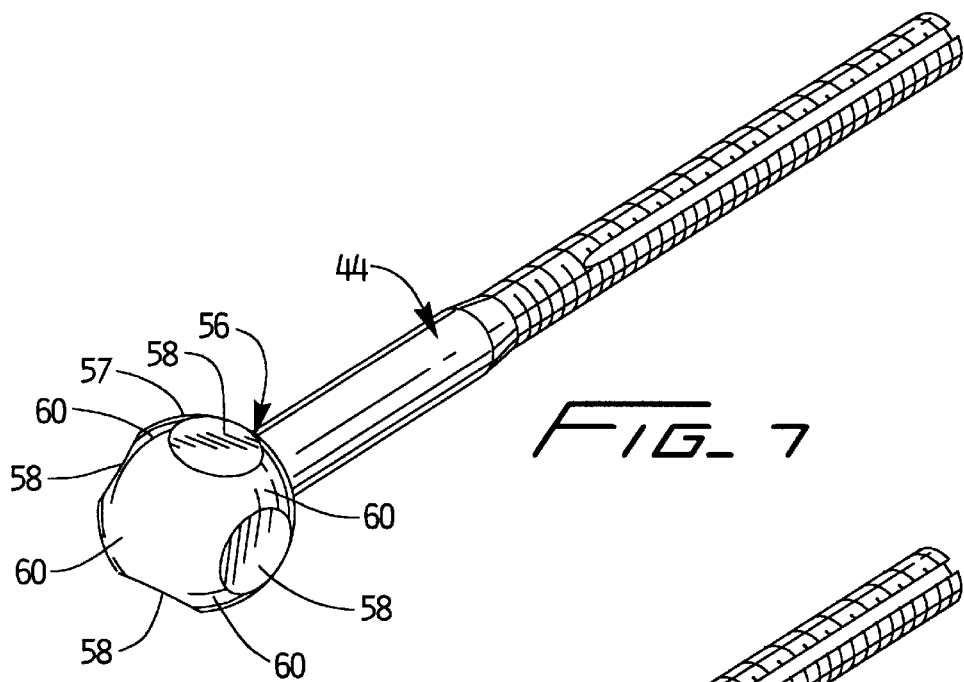
FIG_7
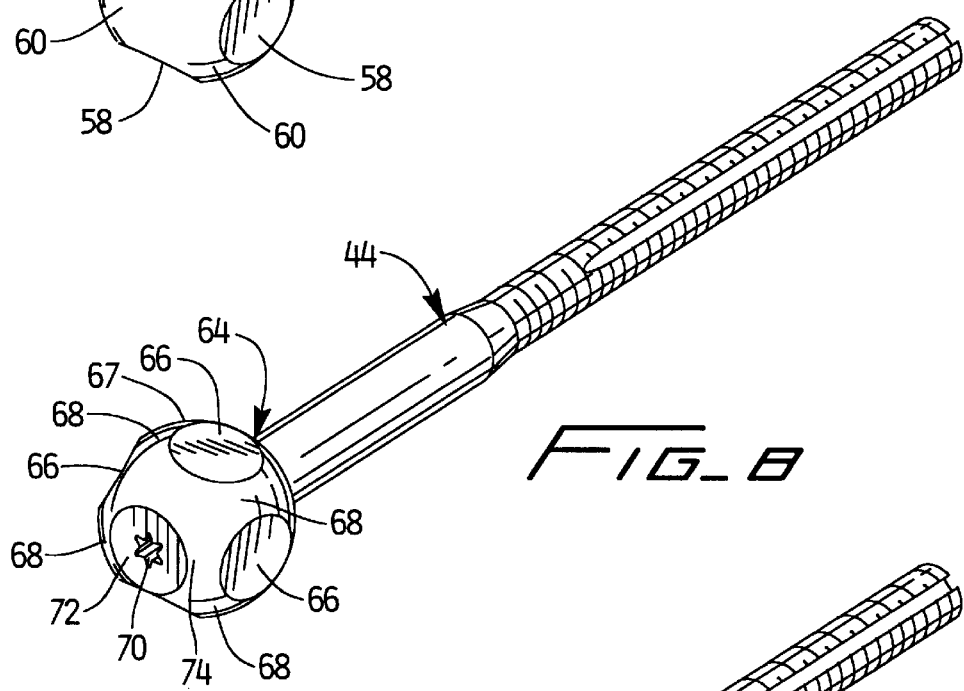
FIG_8
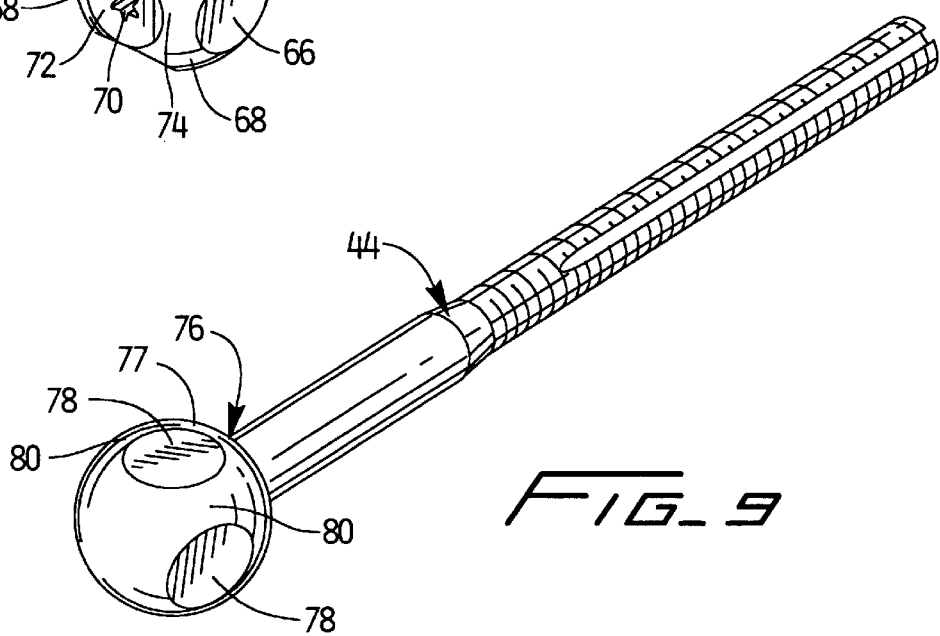
FIG_9

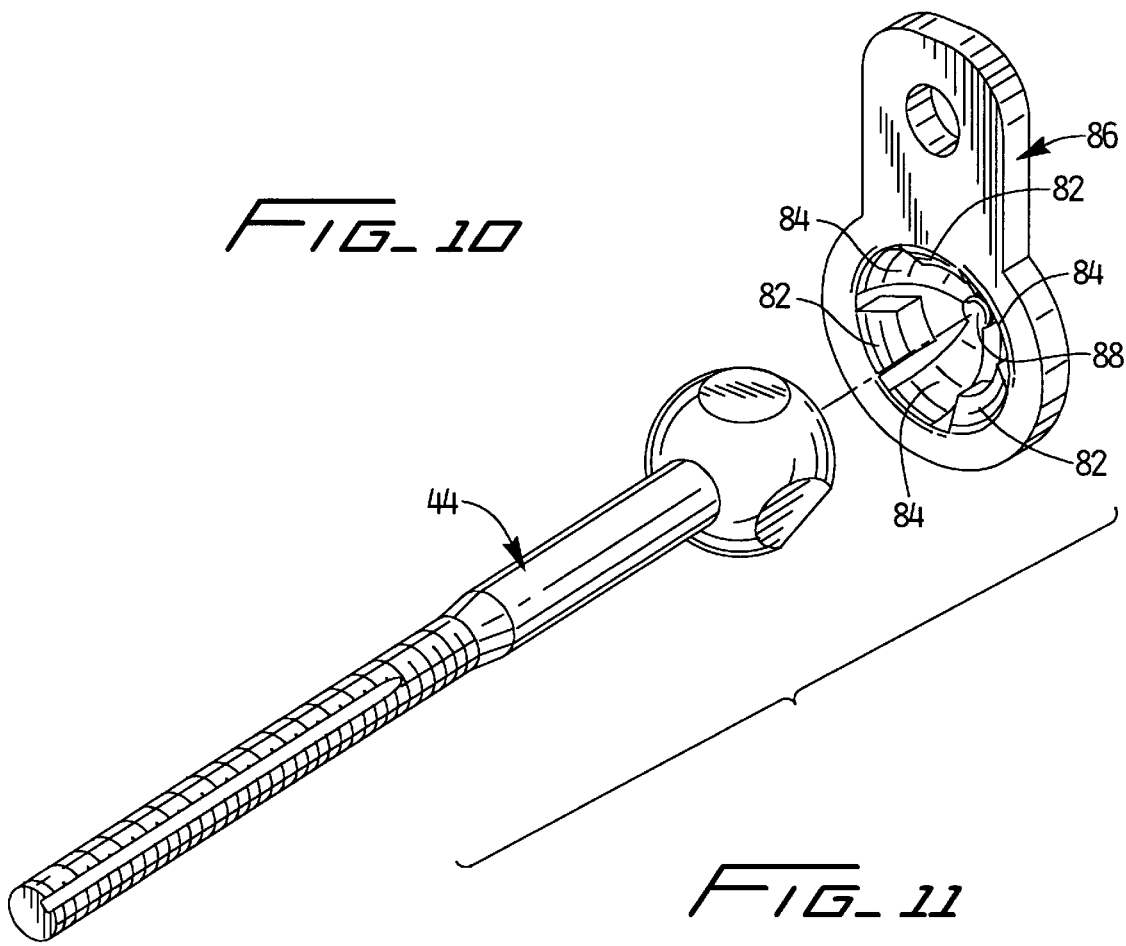
FIG_10
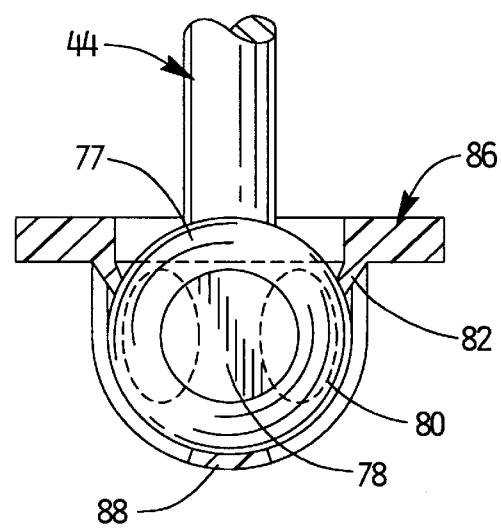
FIG_11

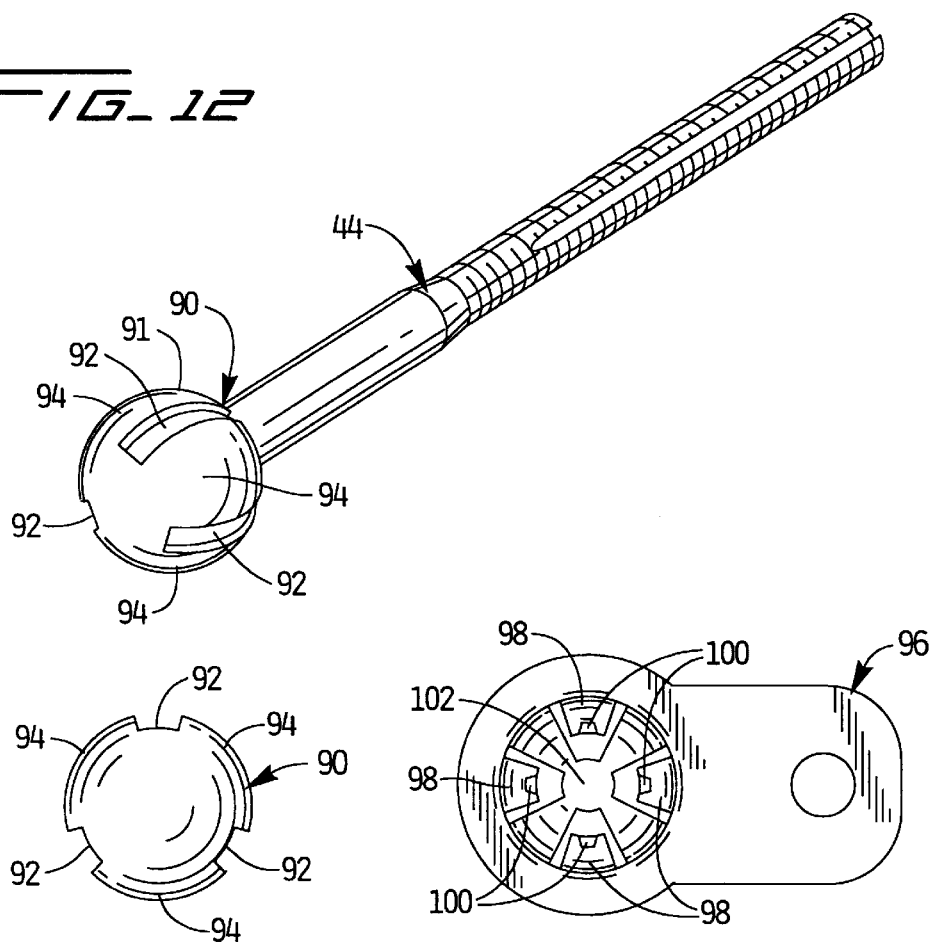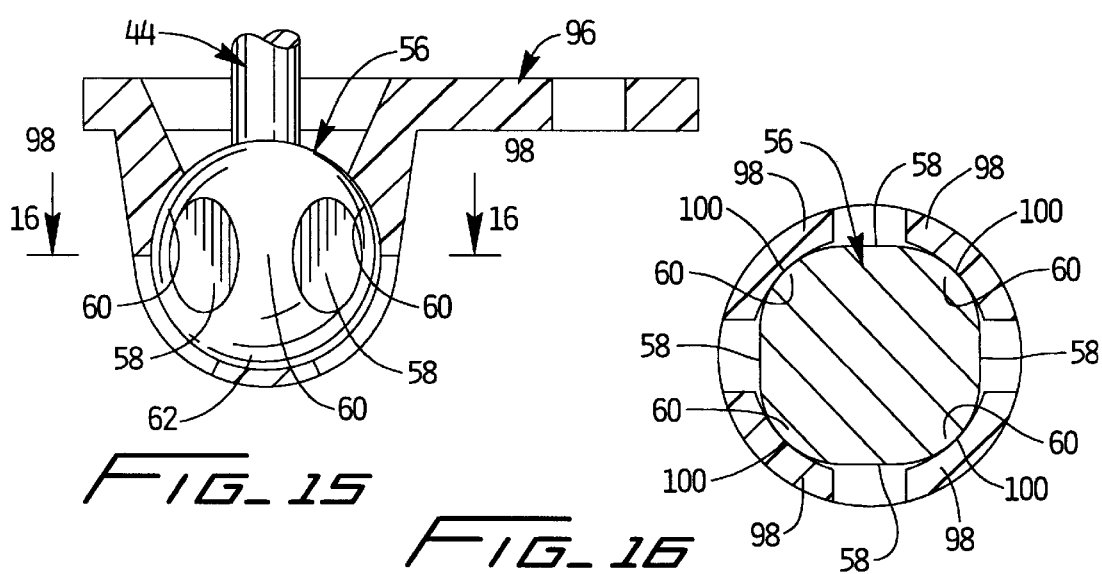

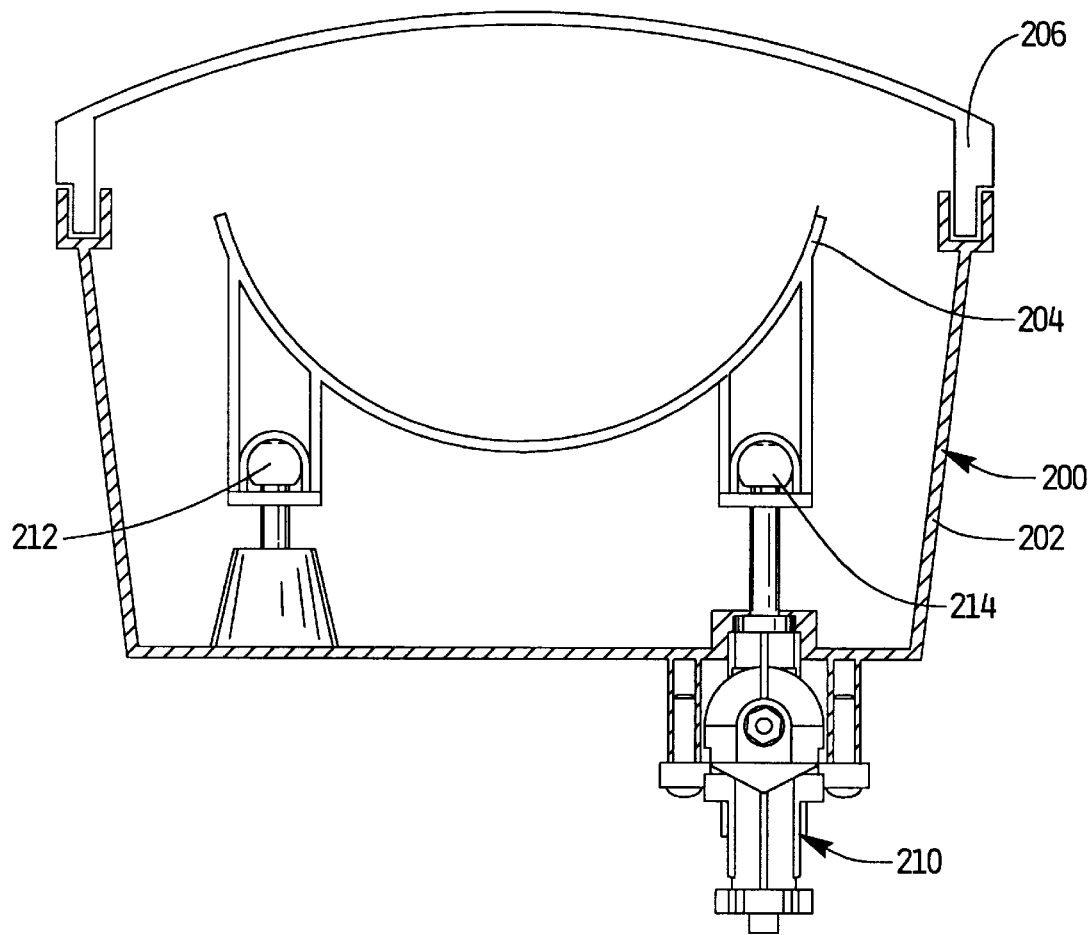
FIG_17

DISENGAGEABLE PIVOT JOINT

BACKGROUND OF THE INVENTION

This invention relates generally to disengageable pivotable joints, and in particular to a disengageable pivotable joint particularly useful for connecting a headlamp adjuster to the reflector inside a headlamp assembly. It also can be used as a compact disengageable connector that allows pivotable movement within the attachment.

Pivotable spherical joints, commonly referred to as ball joints, have a wide variety of applications where a pivotable connection between two parts is desirable. For example, they may be used in many types of linear actuators and have been found to be particularly useful in automotive lamp assemblies. As shown in FIG. 17, similar to FIG. 2 of U.S. Pat. No. 5,707,133 incorporated herein by reference, automotive lamp assemblies 200 used as headlights typically comprise several basic parts: a support frame 202, a reflector 204, a lens 206, a bulb, and one or more adjusters 210. The support frame 202 houses the reflector 204 and the bulb on a pivotable mounting to allow the aim of the light to be adjusted using the adjuster 210. The lens 206 seals the front of the assembly 200 to protect it from the elements assailing the front end of the vehicle and provides an aerodynamic shape and attractive appearance. In such an automotive lamp assembly 200, the reflector 204 mounts inside the housing on one fixed ball joint 212 and is adjustable horizontally and vertically using adjusters 210 that interface with the reflector 204 through moving ball joints 214. The moving ball joints 214 are moveable by actuating the adjusters 210 connected to the moving ball joints 214 by a ball stud having a head and a shaft. Ball joints are required because of the many possible adjustments that may be made to the orientation of the reflector 204. If ball joints are not used, the reflector 204 into which the adjusters 210 are fitted will not be properly adjustable because the reflector 204 will not be positionable in both the vertical and horizontal directions. Right angle adjusters are typically used to allow the adjustment of the headlight from an adjusting position above the installed headlight. In other applications, a motorized adjuster is used.

In some adjusters, the ball stud rotates upon actuation of the adjuster unless it is prevented from doing so by engaging tabs or similar structure on the ball stud. Such adjusters are not readily adaptable for use with the present invention. Examples of such adjusters are disclosed in U.S. Pat. Nos. 4,689,725, 5,161,877 and 5,186,531 which are incorporated herein by reference. Adjusters for use with the present invention should have a means for preventing rotation of the ball stud, head, and shaft included in the adjuster. For example the adjuster disclosed in U.S. Pat. No. 5,707,133, incorporated herein by reference, is ideally suited for use with the present invention as it uses an anti-rotation insert that engages grooves on the shaft to prevent rotation of the ball stud. While one possible application of the present invention is in headlamp assemblies, other applications are possible and references to use in a headlamp assembly should not be deemed to limit the possible uses of the present invention.

As shown in FIGS. 1, 2A, and 2B, conventional ball joints for use in automotive lamp assemblies typically include a ball stud 20 with a spherical engagement head 22 extending from an adjuster, the ball stud 20 is capable of being moved linearly in and out of the adjuster (arrows 24 and 26). Such conventional ball studs 20 typically interface with a plastic socket 28 attached to the reflector such that movement of the ball stud effectuates movement of the reflector. The interface between the ball stud 20 and the socket 28 is such that the head 22 of the ball stud 20 cannot be readily removed from the socket 28 once the head 22 is secured therein. This is because of fingers or tabs 30 protruding from the opening of the socket 28 that retain the head 22 in the socket 28. The fingers or tabs 30 have relief areas 32 interposed therebetween. Retention in the socket is desired because the head 22 cannot be allowed to slip from the socket 28 once the adjuster is installed or the adjuster will not be able to adjust the orientation of the reflector. When engaged in the socket 28, the head 22 of the ball stud 20 is free to pivot within the cup portion 33 of the socket 28.

Additional examples of prior art ball stud and corresponding sockets are shown in FIGS. 4 and 5 of U.S. Pat. No. 4,689,725, FIG. 2 of U.S. Pat. No. 5,161,877, FIG. 1 of U.S. Pat. No. 5,673,992, FIG. 2 of U.S. Pat. No. 5,095,411, and FIGS. 10–14 of U.S. Pat. No. 5,186,532 incorporated herein by reference. Additionally, several U.S. Patents are directed toward ball joints for use in headlamp adjusting mechanisms: 4,974,123, 5,047,904, and 5,063,481, incorporated herein by reference.

While functionally quite effective, there is a major drawback to using conventional ball joints and sockets in modem sealed automotive lamp assemblies. The relatively permanent installation of conventional ball stud heads into sockets does not allow removal of the ball stud should the lamp assembly or adjuster need to be replaced. In conventional assemblies, if the lamp assembly or the adjuster is found to be defective, the entire assembly, including the adjuster, is usually discarded or completely disassembled and reworked. Discarding an entire assembly or an entire adjuster can be quite expensive and it is desirable to salvage the properly working parts, especially in cases where the adjuster is an expensive motorized version.

Accordingly, a need exists for a ball joint that is easily assembled, the head of the ball stud is removable if desired but retains its engagement in the socket as required, maintains its pivotability, cannot be removed from the socket unless desired, and is cost-effective. The present invention relates to an improved ball joint which is capable of being used in automotive lamp assemblies and solves the problems raised or not solved by existing ball joints. Of course, the present invention may be used in a multitude of non-automotive lamp situations where similar performance capabilities are required.

SUMMARY OF THE INVENTION

It is therefore an object of the present invention to provide a ball stud with a head that is removable from the corresponding socket if desired but retains its engagement in the socket as required. It is another object of the present invention to provide a ball stud head and corresponding socket that can provides means for accomplishing the desired adjustment when installed in a lamp assembly. It is an additional object of the present invention to provide a ball stud head and corresponding socket that is cost-effective.

The ball stud and corresponding socket of the present invention provides the above identified and many additional objects by providing a ball stud with an engagement head that can be selectively removed from the corresponding socket as desired, is easily installed, and is cost-effective. As described in more detail below and shown in the accompanying drawings, the head of the ball stud of the present invention includes flats or surfaces such that the thickness of the head at the flat portion is less than the thickness at the rounded portion. While using four flats has been found to be effective, other numbers may be used. Additionally, recessed surfaces or grooves may be used instead of flats. The corresponding socket into which the ball stud head is engaged has fingers or tabs extending into the opening of the socket that correspond to the flats on the head. The flats on the head can pass by the tabs on the socket in order to insert or remove the engagement head from the socket. When the ball stud is rotated such that the flats on the engagement head are no longer oriented toward the tabs, the rounded portion of the head engages the tabs. When the corresponding surfaces are thus engaged, the ball stud cannot be removed from the socket without further rotation within the socket. As such, the ball stud remains free to pivot within the cup portion of the socket but cannot be removed from the socket without rotation of the head.

Installing the ball stud of the present invention into the corresponding socket of the reflector is quite simple. The shaft of the adjuster is aligned with the socket in the reflector such that the flats on the engagement head of the ball stud are oriented toward the tabs on the socket and the head is inserted into the socket. Then, the adjusting shaft is rotated to engage the rounded portions of the head with the tabs of the socket. After such engagement is accomplished, the shaft can be moved by the adjuster in an axial direction to effectuate adjustment of the reflector. Alternatively, the engagement head of the ball stud may be snap-fitted into the socket by forcing the rounded portions of the head past the tabs of the socket as is conventional in the art. Options made available by the ability secure the ball stud in the socket by rotation include designing the tabs of the ball socket with increased thickness to achieve a higher strength connection or using socket materials not well suited for a snap-fitting. If removal of the adjuster from the lamp assembly is desired, the engagement head is easily disengageable from the socket by rotation of the ball stud such that the tabs no longer engage the round portions of the head and the head can freely pass from the socket.

Another application for the present invention is a compact disengageable connector. With a detent or other means to hold the ball and socket in the engaged position, an easy to use connector is created with a pivotal range of motion. One means of designing a detent is to form the tabs to bias the rounded portion of the ball in the engaged position. To remove the ball stud from the socket, one simply rotates the ball to the released position, overcoming the bias of the detent, then removes the ball stud. Re-insertion and engagement is achieved by reversing the process.

While one possible application of the present invention is in headlamp assemblies, many other applications are possible and references to use in a headlamp assembly should not be deemed to limit the uses of the present invention. The terms "ball stud," "engagement head," or "head" as used herein should not be interpreted as being limited to spherical or semispherical shapes, rather, as explained in more detail below, the engagement heads of ball studs in accordance with the present invention may have a wide variety of shapes and may include protrusions having semispherical or otherwise pivotably-shaped tips. The tabs used in the socket can be a wide variety of shapes capable of selectively retaining the ball stud in the socket. The tabs may have detents or other biasing means to bias the ball stud in the retained position. These and other objects and advantages of the present invention will become apparent from the detailed description, claims, and accompanying drawings.

DESCRIPTION OF THE DRAWING

FIG. 1 is an exploded perspective view of a conventional ball stud and corresponding socket;

FIG. 2A is a perspective view of a conventional socket;

FIG. 2B is a side elevation view of a conventional socket viewed generally from the direction indicated by 2B—2B in FIG. 2A;

FIG. 3 is a perspective view of a ball stud constructed in accordance with a preferred embodiment of the present invention;

FIG. 4 is an exploded perspective view of the ball stud of FIG. 3 and the conventional socket of FIGS. 2A and 2B oriented such that the flats of the ball stud can pass by the tabs on the socket;

FIG. 5 is an exploded perspective view of the ball stud of FIG. 3 and the conventional socket of FIGS. 2 and 2A oriented such that if the ball stud were engaged in the socket it could not be removed without rotation of the ball stud;

FIG. 6 is a perspective view of a ball stud constructed in accordance with an additional embodiment of the present invention;

FIG. 7 is a perspective view of a ball stud constructed in accordance with a further embodiment of the present invention;

FIG. 8 is a perspective view of a ball stud constructed in accordance with an additional embodiment of the present invention;

FIG. 9 is a perspective view of a ball stud constructed in accordance with another embodiment of the present invention;

FIG. 10 is a perspective exploded view of a ball stud and socket constructed in accordance with still another embodiment of the present invention;

FIG. 11 is a partial cross-section of the ball stud of FIG. 10 engaged in a corresponding socket;

FIG. 12 is a perspective view of a ball stud constructed in accordance with an additional embodiment of the present invention;

FIG. 13 is atop end of the ball stud of FIG. 12;

FIG. 14 is an end elevation view of an alternative embodiment of a socket for use in connection with a ball stud in accordance with the present invention;

FIG. 15 is a partial cross-section of the ball stud of FIG. 7 shown engaged in the socket of FIG. 14;

FIG. 16 is a cross-section of the ball stud and socket combination of FIG. 15 taken generally along line 16—16; and FIG. 17 is a partial cross-section of an automotive lamp assembly.

DETAILED DESCRIPTION OF THE PREFERRED EMBODIMENTS

FIG. 3 is a perspective view of a ball stud (identified generally as 34) with a partially threaded shaft 44 and a pivotable engagement head 31 in accordance with the present invention. The head 31 of the ball stud 34 includes a plurality of flats or surfaces 36 such that the thickness of the head 31 at the flat portion 36 is less than the thickness at the rounded portion 38. As shown in FIG. 4, the corresponding socket 40 into which the head 31 is engageable may be identical to the conventional socket 28 shown in FIGS. 1, 2A, and 2B. The flats 36 on the head 31 of the ball stud 34 correspond to the fingers or tabs 42 that extend from the opening of the socket 40. The tabs 42 have relief areas 43 interposed therebetween that are formed by legs 35 that extend to the substantially semi-hemispherical backing and cup portion 33 of the socket 40. The flats 36 on the head 31 can pass by the tabs 42 on the socket 40 and the rounded portions 38 of the head 31 can pass through the relief areas 43 in order to insert the head 31 into the socket 40. When the head 31 of the ball stud 34 is rotated such that the flats 36 on the head 31 are no longer oriented toward the tabs 43 extending from the opening of the socket 40 (FIG. 5), the rounded portion 38 of the head 31 engages the tabs 42. When the corresponding tabs 42 and round portions 38 are thus engaged (FIGS. 11 and 15), the head 31 of the ball stud 34 cannot be removed from the socket 40 without further rotation of the head 31 within the socket 40. As such, the head 31 remains free to pivot within the socket 40 but cannot be removed from the socket 40 without rotation.

In one embodiment, the head 31 of the ball stud 34 has a cylindrical protrusion 35 capped by a semi-hemispherical pivot pad 37. When inserted into the socket 40, the pivot pad 37 engages the semi-hemispherical cup portion 33 and effectuates the pivoting objective of the ball stud 34 head 31 and socket 40 engagement.

Ordinarily, the head 31 of the ball stud 34 used with adjusters need only pivot within the socket 40 about three and a half degrees in any direction. Thus, the pivot pad 37 and cup portion 33 engagement easily maintains sufficient pivotability. However, to allow additionally flexibility of design, the socket 40, head 31, ball stud 34, pivot pad 37, and cup portion 33 are typically designed to allow pivoting of up to ten or fifteen degrees. The socket 40 is typically screwed into the reflector of the headlamp assembly through hole 45 but may be integrally formed in the reflector if appropriately flexible materials are used to form the reflector.

Installing the head 31 of the ball stud 34 of the present invention into the corresponding socket 40 attached to the reflector is quite simple. As shown in FIG. 4, the shaft 44 of the adjuster is aligned with the socket 40 attached to the reflector such that the flats 36 on the head 31 are oriented toward the tabs 42 on the socket 40 and the rounded portions 38 of the head 31 are oriented toward the relief areas 43 and the head 31 is inserted into the socket 40. Then, the adjusting shaft 44 (and likely the entire adjuster) is rotated to engage the rounded portions 38 of the head 31 with the tabs 42 of the socket 40. Alternatively, the head 31 of the ball stud 34 can be inserted into the socket 40 in a manner similar to how a conventional ball stud 22 is inserted into a socket 28, that is, by snapping the head 31 past the tabs 42 on the socket 40. After such engagement is accomplished, the shaft 44 can be moved by the adjuster in either direction substantially parallel with the shaft 44 to effectuate adjustment of the reflector by movement of the socket 40. If removal of the adjuster from the lamp assembly is desired, the ball stud 34 can be disengaged from the socket 40 by rotating the ball stud 34 such that the tabs 42 of the socket 40 no longer engage the round portions 38 of the ball stud 34 and the rounded portions 38 of the ball stud 34 are oriented toward the relief areas 43. The ball stud 34 can thus freely pass from the socket 40 because the flats 36 on the ball stud 34 can pass by the tabs 42 on the socket 40 and the rounded portions 38 can pass through the relief areas 43.

Installing the shaft 44 into the gear of the adjuster typically requires screwing the shaft 44 into the gear (see U.S. Pat. No. 5,707,133 incorporated herein by reference). As such, a means for grasping the ball stud 34 must be provided such that rotation of the shaft 44 can be easily accomplished. In the embodiment of the present invention shown in FIGS. 3, 4, 5, such grasping and rotation is accomplished by a square-shaped driving socket that engages the flat portions 36 on the head 31 of the ball stud 34. Rotation of the square-shaped driving socket thus accomplishes rotation of the head 31, ball stud 34, and shaft 44.

One alternative embodiment of the present invention is shown in FIG. 6. As with the embodiment shown in FIGS. 3, 4, and 5, the head 47 of the ball stud 46 has a number of flats 48 with rounded portions 50 interposed therebetween. The head 47 has a hexagonally-shaped protrusion 52 capped by a semi-hemispherical pivot pad 54. When inserted into the socket 40, the pivot pad 54 engages the semi-hemispherical cup portion 33 of the socket 40 and effectuates the pivoting objective of the ball stud 46 and socket 40 engagement. In this embodiment, the screwing of the shaft 44 into the gear of the adjuster may be accomplished either by rotation of a square-shaped driving socket 45 or by use of a hexagonal driving socket engaging the hexagonally-shaped protrusion 52.

Another alternative embodiment of the present invention is shown in FIG. 7. As with the previously described embodiments, the head 57 of the ball stud 56 has a number of flats 58 with rounded portions 60 interposed therebetween. The head 57 is capped by a semi-hemispherical pivot pad 62. When inserted into the socket 40, the pivot pad 62 engages the semi-hemispherical cup portion 33 of the socket 40 and effectuates the pivoting objective of the ball stud 56 and socket 40 engagement. In this embodiment, the screwing of the shaft 44 into the gear of the adjuster can be accomplished by rotation of a square-shaped driving socket 45.

An additional embodiment of the present invention is shown in FIG. 8. As with the previously described embodiment, the head of the ball stud 64 has a number of flats 66 with rounded portions 68 interposed therebetween. The head 67 has a small flattened end portion 70 with a Torx® or hexagonally-shaped driving receptacle 72 formed therein. The head 67 has a sufficiently rounded end portion 74 that when inserted into the socket 40, the rounded end portion 74 engages the semi-hemispherical cup portion 33 of the socket 40 and effectuates the pivoting objective of the ball stud 64 and socket 40 engagement. In this embodiment, the screwing of the shaft 44 into the gear of the adjuster may be accomplished either by rotation of a square-shaped driving socket 45 or by use of a hexagonal or Torx® driver engaging the driving receptacle 72.

The further embodiment of the head 77 of a ball stud 76 in accordance with the present invention shown in FIGS. 9 and 10 has three flats 78 with three rounded portions 80 interposed therebetween that correspond to the three tabs 82 and three relief areas 84 interposed therebetween. The head 77 is inserted into the socket 86 as in the previously described embodiments. FIG. 11 is a cross-section of the ball stud 76 head 77 of FIGS. 9 and 10 engaged in the socket 86 such that it cannot be removed without additional rotation but remains free to pivot within the cup portion 88 of the socket 86. In this embodiment, the screwing of the shaft 44 into the gear of the adjuster may be accomplished by rotation of a substantially triangular-shaped driving socket that engages the flats 78. Other embodiments of the ball stud head may have two flat areas or even one flat area with a corresponding par of tabs or one tab on the socket. In such embodiments, the screwing of the shaft 44 into the gear of the adjuster may be accomplished using a correspondingly shaped driving socket.

The embodiment of the head 91 of a ball stud 90 in accordance with the present invention shown in FIGS. 12 and 13 has grooves 92 instead of the flats used in the previously described embodiments. This embodiment also has rounded portions 94 as in the previous embodiments. The grooves 92 may be positioned such that the tabs 82 extending from the opening of the socket 86 (in this example, the one in FIG. 10) are freely passed and the head 91 can be removed from the socket. Of course, other numbers of grooves 92 and tabs 82 may be used.

FIGS. 14, 15, and 16, show an alternative embodiment of a socket 96 for use with a ball stud 56 in accordance with the present invention. In the example shown, the ball stud 56 and head 57 of FIG. 7 is shown but others may be used. In this embodiment of the socket 96, the tabs 98 extending from the opening of the socket 96 include biasing means in the form of detents 100 that tend to bias the head 57 in the retention position by enveloping the rounded portions 60 of the head 57. Biasing means other than the detents 100 shown in the Figures may be used to achieve the biasing objective. The pivot pad 62 pivots within the semi-hemispherical cup portion 102 of the socket 96. The head 57 may be removed from the socket 96 by rotating the head 57 such that the flat portions 58 are oriented toward the tabs 98. However, because of the detents 100, stronger rotational force is required to position the head 57 for removal than is required in conventional sockets. While the ball stud 56 and head 57 shown in FIGS. 14, 15, and 16 is the one shown in FIG. 7, similar tab 98 and detent 100 configurations may be used with the other embodiments of the ball stud.

Ball studs in accordance with the present invention may be made from a variety of materials depending on the particular application. The ball studs used in headlamp adjusters are typically are manufactured from metal or plastic, typically steel, zinc, brass, or nylon, when the adjuster is a standard adjuster (such as the one disclosed in U.S. Pat. No. 5,707,133) or from hard plastic or cast zinc when the adjuster is a motorized one. When the ball stud, head, and shaft are formed from metal, it may be manufactured by cold-heading, casting, or by other processes capable of forming the desired shape. When the ball stud, head, and shaft are formed from plastic, a molding process or other processes capable of forming the desired shape can be used to form the ball stud. Because of the various limitations and advantages of the various manufacturing processes, the ball stud 34 and head 31 shown in FIGS. 3, 4, and 5, can be manufactured by cold heading, casting, or molding; the ball stud 46 and head 47 shown in FIG. 6 can be manufactured by cold heading, casting, or molding; the ball stud 56 and head 57 in FIG. 7 can be manufactured by molding or casting; the ball stud 64 and head 67 shown in FIG. 8 can be manufactured by molding or casting; the ball stud 76 and head 77 shown in FIGS. 9 and 10 can be formed by molding or casting; and the ball stud 90 and head 91 shown in FIGS. 12 and 13 can be formed by molding or casting. Sockets used in connection with the ball stud of the present invention are typically formed by molding. Of course, the ball studs and sockets may be manufactured by other processes as is appropriate for the particular configuration.

As illustrated by the foregoing description and shown in the Figures, the present invention is more suitable as a ball stud and corresponding socket in many applications than are conventional ball studs and sockets. The present invention overcomes the limitations and disadvantages of existing ball studs by utilizing an effective design whereby the head can be selectively removed from the corresponding socket as desired, is easily installed, and is cost effective. Of course, the ball stud and corresponding socket of the present invention has many other applications aside from use in a lamp assembly.

Although the invention has been herein shown and described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and therefore, the invention is to be taken as including all reasonable equivalents to the subject matter of the appended claims.

I claim:

1. A pivotable joint comprising:

a ball stud including a shaft portion ending in an engagement head, the engagement head having at least one reduced diameter portion, the at least one reduced diameter portion including a plane in substantially parallel alignment with the axis of the shaft portion of the ball stud; and a socket into which the engagement head is removably engageable and within which the engagement head is freely rotatable, the socket having an opening with at least one tab extending therefrom to retain the engagement head in the socket, the at least one tab being selectively disengageable from the engagement head by rotation of the engagement head within the socket such that the at least one reduced diameter portion is oriented toward the at least one tab.

2. The pivotable joint of claim 1 wherein the at least one reduced diameter portion of the engagement head is a substantially flat surface.

3. The pivotable joint of claim 2 further comprising an adjuster and a positionable reflector of a vehicle lamp assembly, the pivotable joint installed to provide a pivotable connection between the adjuster and the reflector.

4. The pivotable joint of claim 2 wherein the engagement head further comprises:

a truncated end portion, the truncated end portion having a cylindrical protrusion extending therefrom; and a pivot pad capping the protrusion.

5. The pivotable joint of claim 2 wherein the engagement head further comprises:

a truncated end portion, the truncated end portion having a hexagonal protrusion extending therefrom; and a pivot pad capping the protrusion.

6. The pivotable joint of claim 2 further comprising a flattened end portion, the end portion having a drive socket situated therein.

7. The pivotable joint of claim 1 wherein the at least one reduced diameter portion of the engagement head is a groove.

8. The pivotable joint of claim 7 wherein the engagement head further comprises:

a truncated end portion, the truncated end portion having a cylindrical protrusion extending therefrom; and a pivot pad capping the protrusion.

9. The pivotable joint of claim 7 wherein the engagement head further comprises:

a truncated end portion, the truncated end portion having a hexagonal protrusion extending therefrom; and a pivot pad capping the protrusion.

10. The pivotable joint of claim 7 further comprising a flattened end portion, the end portion having a drive socket situated therein.

11. The pivotable joint of claim 7 further comprising an adjuster and a positionable reflector of a vehicle lamp assembly, the pivotable joint installed to provide a pivotable connection between the adjuster and the reflector.

12. A pivotable joint comprising:
   a ball stud including a shaft portion ending in an engagement head, the engagement head having at least one reduced diameter portion, the at least one reduced diameter portion including a plane in substantially parallel alignment with the axis of the shaft portion of the ball stud; and
   a socket into which the engagement head is removably engageable and within which the engagement head is freely rotatable, the socket having a rim with at least one extension to retain the engagement head in the socket, the at least one extension being selectively disengageable from the engagement head by rotation of the engagement head within the socket such that the at least one reduced diameter portion is oriented toward the at least one extension.

13. The pivotable joint of claim 12 wherein the at least one reduced diameter portion of the engagement head is a substantially flat surface.

14. The pivotable joint of claim 12 further comprising an adjuster and a positionable reflector of a vehicle lamp assembly, the pivotable joint installed to provide a pivotable connection between the adjuster and the reflector.

15. The pivotable joint of claim 13 wherein the engagement head further comprises:
   a truncated end portion, the truncated end portion having a cylindrical protrusion extending therefrom; and
   a pivot pad capping the protrusion.

16. The pivotable joint of claim 13 wherein the engagement head further comprises:
   a truncated end portion, the truncated end portion having a hexagonal protrusion extending therefrom; and
   a pivot pad capping the protrusion.

17. The pivotable joint of claim 13 further comprising a flattened end portion, the end portion having a drive socket situated therein.

18. The pivotable joint of claim 12 wherein the at least one reduced thickness portion of the engagement head is a groove.

19. The pivotable joint of claim 18 wherein the engagement head further comprises:
   a truncated end portion, the truncated end portion having a cylindrical protrusion extending therefrom; and
   a pivot pad capping the protrusion.

20. The pivotable joint of claim 18 wherein the engagement head further comprises:
   a truncated end portion, the truncated end portion having a hexagonal protrusion extending therefrom; and
   a pivot pad capping the protrusion.

21. The pivotable joint of claim 18 further comprising a flattened end portion, the end portion having a drive socket situated therein.

22. A pivotable joint between a ball stud including a shaft portion ending in an engagement head and a socket, the pivotable joint comprising:
   at least one reduced diameter portion on the engagement head, the at least one reduced diameter portion including a plane in substantially parallel alignment with the axis of the shaft portion of the ball stud;
   an opening and a substantially semi-hemispherical hollow backing forming the socket; and
   at least one tab extending into the opening of the socket to retain the engagement head in the socket, the at least one reduced diameter portion of the engagement head capable of being selectively oriented toward the at least one tab such that the engagement head can be removed from the socket by axial movement substantially parallel with the axis of the shaft portion of the ball stud, and wherein the engagement head is freely rotatable within the socket.

23. The pivotable joint of claim 22 wherein the at least one reduced diameter portion of the engagement head is a substantially flat surface.

24. The pivotable joint of claim 23 further comprising an adjuster and a positionable reflector of a vehicle lamp assembly, the pivotable joint installed to provide a pivotable connection between the adjuster and the reflector.

25. The pivotable joint of claim 22 further comprising an adjuster and a positionable reflector of a vehicle lamp assembly, the pivotable joint installed to provide a pivotable connection between the adjuster and the reflector.

26. The pivotable joint of claim 22 wherein the engagement head further comprises:
   a truncated end portion, the truncated end portion having a cylindrical protrusion extending therefrom; and
   a pivot pad capping the protrusion.

27. The pivotable joint of claim 22 wherein the engagement head further comprises:
   a truncated end portion, the truncated end portion having a hexagonal protrusion extending therefrom; and
   a pivot pad capping the protrusion.

28. The pivotable joint of claim 22 further comprising a flattened end portion, the end portion having a drive socket situated therein.

29. A pivotable joint in a headlamp assembly between a ball stud extending from an adjuster and a reflector, the pivotable joint comprising:
   the ball stud having a shaft ending in an engagement head, the engagement head having at least one reduced diameter portion and at least one engaging surface, the at least one reduced diameter portion including a plane in substantially parallel alignment with the axis of the shaft portion of the ball stud; and
   a socket in the reflector into which the engagement head is removably engageable and within which the engagement head is freely rotatable, the socket having an opening with at least one tab extending therefrom to retain the engagement head in the socket, the at least one tab being selectively engageable with the at least one engaging surface by rotation of the engagement head within the socket.

30. The pivotable joint of claim 29 wherein the at least one reduced thickness portion of the engagement head is a substantially flat surface.

31. The pivotable joint of claim 29 wherein the engagement head further comprises:
   a truncated end portion, the truncated end portion having a cylindrical protrusion extending therefrom; and
   a pivot pad capping the protrusion.

32. The pivotable joint of claim 29 wherein the ball stud further comprises:
   a truncated end portion, the truncated end portion having a hexagonal protrusion extending therefrom; and
   a pivot pad capping the protrusion.

33. The pivotable joint of claim 29 further comprising a flattened end portion, the end portion having a drive socket situated therein.

34. A headlamp assembly including a frame, reflector, lens, and at least one adjuster wherein the at least one adjuster is operably connected to the reflector by a ball stud and socket assembly, the ball stud and socket assembly comprising:

an engagement head on the end of a shaft of the ball stud;

at least one engaging surface on the engagement head;

at least one reduced diameter disengaging face on the engagement head, the face being in substantially parallel alignment with the axis of the shaft portion of the ball stud;

a rim and a substantially semispherical hollow backing forming the socket; and at least one tab extending from the rim of the socket into the hollow of the substantially semispherical backing, the at least one tab capable of selectively engaging the at least one engaging surface of the engagement head such that the engagement head will resist being removed from the socket by axial movement of the ball stud substantially parallel with the axis of the shaft, and wherein the engagement head is freely rotatable within the socket.

35. The pivotable joint of claim 34 wherein the at least one disengaging face of the engagement head is a substantially flat surface.

36. The pivotable joint of claim 34 wherein the at least one disengaging face of the engagement head is a groove.

37. The pivotable joint of claim 34 wherein the engagement head further comprises:

a truncated end portion, the truncated end portion having a cylindrical protrusion extending therefrom; and a pivot pad capping the protrusion.

38. The pivotable joint of claim 34 wherein the engagement head further comprises:

a truncated end portion, the truncated end portion having a hexagonal protrusion extending therefrom; and a pivot pad capping the protrusion.

39. The pivotable joint of claim 34 further comprising a flattened end portion, the end portion having a drive socket situated therein.

40. A pivotable joint comprising:

a ball stud including a shaft ending in an engagement head, the engagement head having at least one reduced diameter portion, the at least one reduced diameter portion including a plane in substantially parallel alignment with the axis of the shaft portion of the ball stud; and a socket into which the engagement head is removably engageable and within which the engagement head is freely rotatable, the socket having an opening with at least one tab extending therefrom to retain the engagement head in the socket, the socket including a biasing means capable of biasing the ball stud in an engaged position, the at least one tab being selectively disengageable from the engagement head by rotation of the engagement head within the socket such that the at least one reduced diameter portion is oriented toward the at least one tab.

41. The pivotable joint of claim 40 wherein the biasing means is a detent on the at least one tab.

42. The pivotable joint of claim 41 wherein the ball stud extends from an adjuster and the socket is disposed in a reflector.

43. A method of removably engaging an engagement head of a ball stud having a shaft portion in a socket, the socket having an opening with at least one tab extending therefrom and a cup portion, the engagement head having at least one reduced diameter portion, the reduced diameter portion in substantially parallel alignment with the axis of the shaft portion of the ball stud, the method comprising the steps of:

orienting the engagement head such that the at least one reduced diameter portion is oriented toward the at least one tab extending from the opening of the socket;

inserting the engagement head into the cup portion of the socket such that the engagement head passes by the at least one tab extending from the opening of the socket, such that the at least one tab is not flexed as the engagement head passes into the socket, and such that the engagement head is freely rotatable within the socket; and rotating the ball stud such that the reduced diameter portion of the engagement head is not oriented toward the at least one tab extending from the opening of the socket resulting in the retention of the engagement head in socket when the ball stud is moved along its axis.

44. The method of claim 43 wherein the ball stud extends from an adjuster and the socket is disposed in a reflector.

45. The method of claim 43 further comprising the steps of:

rotating the ball stud such that the engagement head is oriented toward the at least one tab extending from the opening of the socket; and removing the engagement head from the cup portion of the socket such that the reduced thickness portion of the engagement head passes by the at least one tab extending from the opening of the socket.

46. A pivotable joint comprising:

a ball stud including a shaft portion ending in an engagement head, the engagement head having a substantially spherical surface with a flattened end and at least one depressed surface portion, the at least one depressed surface portion forming a gap in the otherwise spherical surface of the engagement head; and a socket into which the engagement head is removably engageable and within which the engagement head is freely rotatable, the socket having an opening with at least one tab extending therefrom to retain the engagement head in the socket, the at least one tab being selectively disengageable from the engagement head by rotation of the engagement head within the socket such that the at least one depressed surface portion is oriented toward the at least one tab.

* * * * *